Feb. 6, 1945. G. C. WHITE 2,368,735
DEVICE FOR MEASURING AND DISPENSING LIQUID
Filed Nov. 20, 1942
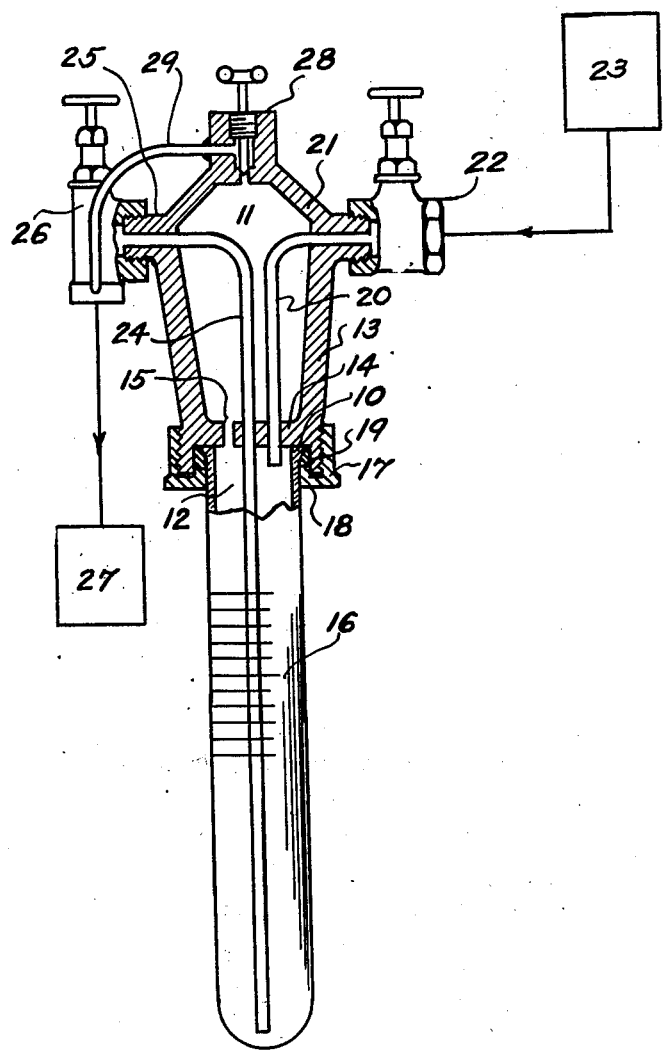
INVENTOR
GEORGE C. WHITE
BY
ATTORNEY Patented Feb. 6, 1945

2,368,735

UNITED STATES PATENT OFFICE 2,368,735

DEVICE FOR MEASURING AND DISPENSING LIQUID

George Cecil White, Rutherford, N. J.

Application November 20, 1942, Serial No. 466,241

2 Claims. (Cl. 62—1)

This invention relates to the art of dispensing fluids and in particular is concerned with dispensing measured and definite amounts of highly volatile fluids which can exist in the liquid state only under pressure or at low temperatures.

The apparatus is designed especially for handling low boiling point liquids such as methyl bromide and is so constructed that any desired volume of liquid may be withdrawn from one container and accurately measured before being dispensed or supplied, for example, to a chamber which is to be fumigated or otherwise treated.

Numerous devices are on the market which function satisfactorily in dispensing methyl bromide and other low boiling point liquids but these are usable only with a volume of liquid which has already been measured and is maintained under pressure in a container. Usually these devices are arranged to puncture the liquid container and distribute the liquid through a dispensing tube which is in communication with the container through the punctured aperture. The chief objection to these devices is the impracticability of obtaining containers which are of a size to hold just the proper amount of fluid necessary to treat or fumigate a particular chamber and consequently there is usually some fluid wasted since it is usually necessary to use all the liquid in the container after it has once been punctured.

The apparatus of the present invention differs from these devices in that just the proper volume of liquid is first withdrawn from a fluid supply container and maintained in a measuring receptacle from which it is then distributed to the chamber to be treated, through the dispensing tube. The fluid supply container will by preference be of large volume so that a number of measured quantities of liquid may be withdrawn therefrom as would be necessary when fumigating a number of chambers, for example, a train of pullman cars. A pressure chamber is provided in communication with the measuring receptacle and during the transfer of fluid from the fluid supply container to the measuring receptacle sufficient pressure will be created to then force the liquid from the receptacle in liquid form into the chamber to be treated, wherein the liquid will become vaporized. Valves are provided for controlling the flow of liquid from the fluid supply container to the measuring receptacle and also for controlling the flow from the measuring receptacle to the chamber to be treated and preferably a pressure release valve will be provided for the pressure chamber in case the pressure therein becomes too great as when operating the dispenser under high temperature conditions.

One object of the invention is to provide a liquid measuring and dispensing device which is compact in form and strongly constructed. Another object is to provide such a device which is adaptable to dispense any desired volumes of liquid. Another object is to provide such an apparatus for handling low boiling liquids in a manner to prevent undue vaporization.

Other objects will become apparent from the following detailed description.

Referring to the single figure of the drawing wherein the device is shown in elevation with portions thereof in section to point out details of construction, the numeral 10 indicates the device generally which is made up of an upper chamber 11 and a lower chamber 12. The device will be described as constructed for use with methyl bromide and hence the various elements and parts from which it is made will be resistant to the action of the fluid. However, it is to be understood that the invention is not to be limited to an apparatus constructed of the particular materials mentioned. The upper chamber 11 is formed of a brass casing 13 which preferably is cast to provide the desired chamber. The lower wall 14 of the casing is apertured at 15 to be in communication with the lower chamber 12 which, by choice, is formed of a transparent glass tube 16. The brass casing 13 and the tube 16 are removably secured together by nut 17 having an inner flange 18 thereon for holding a washer 19 of any material resistant to the action of methyl bromide and which is secured between the lower wall 14 of the casing and the inner flange 18. The glass tube 16 is suitably graduated as indicated for measuring liquid which is supplied thereto.

The particular manner of supplying the methyl bromide to the measuring tube 16 comprises a tube 20 of copper or suitable plastic material which has one end secured to and communicating through the lower wall 14 of the casing 13 to be in direct communication with the chamber 12 and its other end in communication with a fluid supply inlet 21 which is provided with a suitable valve 22 for regulating the supply of the fluid from a methyl bromide container 23. With this arrangement the tube passes through the upper chamber 11 but no fluid from the supply container comes in contact with the walls of casing 13 and as a result vaporization is reduced to a minimum and the methyl bromide enters the chamber 12 formed by the measuring glass 16 in liquid state. A dispensing tube 24 of suitable material extends through the lower wall 14 of casing 13 and has its lower end positioned adjacent the bottom of the measuring tube 16 and its other end in communication with outlet 25 which is also provided with a suitable valve 26 for controlling the flow of liquid to the chamber 27 which is to be treated.

Depending upon the temperature conditions prevailing when and where the apparatus is used, varying pressures will exist in the upper pressure chamber 11 and when the pressure therein becomes too high, a pressure release valve 28 is provided in the casing to exhaust the air. Preferably a connecting tube 29 is disposed between the exhaust valve 28 and outlet valve 26 in order to utilize the air pressure in dispensing the liquid from the measuring tube 16 to the chamber 27 which is to be treated.

While the invention has been described in connection with only one embodiment thereof it will be appreciated that numerous modifications of the apparatus are possible and hence the invention is to be limited only by the scope of the appended claims.

What is claimed is:

1. A device for dispensing highly volatile fluids which comprises an upper pressure chamber in communication with a lower measuring chamber, a fluid inlet in the pressure chamber wall, an induction tube extending through said pressure chamber having one end in communication with said inlet and its other end in communication with the upper end of the measuring chamber for supplying fluid thereto, a fluid outlet in the pressure chamber wall spaced from said fluid inlet, an eduction tube extending through said pressure chamber having one end in communication with said outlet and its other end positioned adjacent the bottom of said measuring chamber for removing fluid therefrom.

2. A device for dispensing highly volatile fluids which comprises an upper pressure chamber in communication with a lower measuring chamber, a fluid inlet in the pressure chamber wall, an induction tube extending through said pressure chamber having one end in communication with said inlet and its other end in communication with the upper end of the measuring chamber for supplying fluid thereto, a fluid outlet in the pressure chamber wall spaced from said fluid inlet, an eduction tube extending through said pressure chamber having one end in communication with said outlet and its other end positioned adjacent the bottom of said measuring chamber for removing fluid therefrom, valve means in said fluid inlet and outlet for cooperating in the supply of measured volumes of fluid to the measuring chamber before it is dispensed therefrom.

GEORGE CECIL WHITE.